US012647384B2

(12) United States Patent
Bradley et al.

(10) Patent No.: US 12,647,384 B2
(45) Date of Patent: *Jun. 2, 2026

(54) INTELLIGENT MESSAGING DELIVERY

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/761,233

(22) Filed: Jul. 1, 2024

(65) Prior Publication Data

US 2024/0356882 A1     Oct. 24, 2024

Related U.S. Application Data

(63) Continuation of application No. 17/814,688, filed on Jul. 25, 2022, now Pat. No. 12,028,309.

(51) Int. Cl.
*H04L 51/226* (2022.01)
*H04L 51/043* (2022.01)

(52) U.S. Cl.
CPC .......... *H04L 51/226* (2022.05); *H04L 51/043* (2013.01)

(58) Field of Classification Search
None
See application file for complete search history.

(56) References Cited

U.S. PATENT DOCUMENTS

| | | | |
|---|---|---|---|
| 6,986,036 B2 * | 1/2006 | Wang | H04L 67/02 |
| | | | 713/168 |
| 7,222,156 B2 * | 5/2007 | Gupta | G06F 40/169 |
| | | | 715/752 |
| 7,480,696 B2 * | 1/2009 | Kirkland | H04L 51/04 |
| | | | 709/205 |
| 8,346,593 B2 * | 1/2013 | Fanelli | G06Q 30/02 |
| | | | 705/7.29 |
| 8,934,379 B2 * | 1/2015 | Swanburg | H04L 51/48 |
| | | | 370/259 |
| 9,092,742 B1 * | 7/2015 | Zeng | H04L 51/063 |

(Continued)

*Primary Examiner* — Backhean Tiv

(57) ABSTRACT

The disclosed technology is directed towards delivering electronic messages from senders to recipients in an intelligent way, based on the determined likelihood of each recipient acting on a message. Message delivery can be delayed upon delayed message delivery criterion being satisfied, based on user profile data the user establishes for each messaging application. Predicted recipient user availably, predicted recipient user receptivity and/or the identity of the sender, for example, can be used as factors in determining delivery data representing the likelihood of a recipient acting on a message. Delivery of the message is to a recipient's device is delayed when the delivery data satisfies delayed delivery criterion. The delayed delivery time can be determined from the recipient user's predicted availably and/or receptivity data, and/or the identity of the sender. The sender is notified of a delayed message delivery, and can be presented with options as to other actions to take.

20 Claims, 16 Drawing Sheets

(56)                References Cited

U.S. PATENT DOCUMENTS

| | | | | |
|---|---|---|---|---|
| 9,106,473 | B2 * | 8/2015 | Altberg | H04L 65/103 |
| 9,154,926 | B1 * | 10/2015 | Steele | H04L 51/214 |
| 9,166,822 | B2 * | 10/2015 | Haynes | H04L 51/043 |
| 9,288,076 | B2 * | 3/2016 | Klug | H04L 67/54 |
| 9,306,895 | B1 * | 4/2016 | Raden | H04L 51/23 |
| 9,386,110 | B2 * | 7/2016 | Cudak | H04L 51/043 |
| 9,432,324 | B2 * | 8/2016 | DeLuca | H04L 51/52 |
| 9,591,101 | B2 * | 3/2017 | Word | H04L 67/1023 |
| 9,602,458 | B2 * | 3/2017 | DeLuca | H04L 51/226 |
| 9,769,012 | B2 * | 9/2017 | Rheinheimer | H04W 4/12 |
| 9,930,002 | B2 * | 3/2018 | Ghafourifar | H04L 51/066 |
| 9,979,692 | B2 * | 5/2018 | Freed | H04L 51/226 |
| 10,218,658 | B2 * | 2/2019 | Parizhsky | H04L 51/226 |
| 10,313,277 | B2 * | 6/2019 | Yates | H04L 51/222 |
| 10,678,614 | B2 * | 6/2020 | Singh | G06F 12/0868 |
| 10,728,199 | B2 * | 7/2020 | Grochocki, Jr. | H04L 51/42 |
| 10,764,226 | B2 * | 9/2020 | Goldstein | H04L 51/226 |
| 10,771,419 | B2 * | 9/2020 | Charignon | H04L 67/535 |
| 10,785,172 | B2 * | 9/2020 | Cherifi | H04L 51/214 |
| 10,834,028 | B2 * | 11/2020 | Arquero | H04L 67/52 |
| 11,108,718 | B1 * | 8/2021 | Jain | H04L 51/23 |
| 11,432,047 | B1 * | 8/2022 | Panchaksharaiah | H04L 51/046 |
| 12,028,309 | B2 * | 7/2024 | Bradley | H04L 51/222 |
| 2003/0193967 | A1 * | 10/2003 | Fenton | H04W 4/12 |
| | | | | 370/469 |
| 2006/0004622 | A1 * | 1/2006 | Fanelli | G06Q 30/0202 |
| | | | | 705/7.33 |
| 2007/0133594 | A1 * | 6/2007 | Pazhyannur | H04L 51/063 |
| | | | | 370/465 |
| 2009/0055489 | A1 * | 2/2009 | Agarwal | G06Q 10/107 |
| | | | | 709/206 |
| 2009/0285129 | A1 * | 11/2009 | Swanburg | G06Q 10/107 |
| | | | | 370/259 |
| 2011/0093543 | A1 * | 4/2011 | Goldman | H04L 51/226 |
| | | | | 455/466 |
| 2014/0214973 | A1 * | 7/2014 | DeLuca | H04L 51/226 |
| | | | | 709/206 |
| 2015/0142901 | A1 * | 5/2015 | Hon | H04L 51/226 |
| | | | | 709/206 |
| 2015/0178626 | A1 * | 6/2015 | Pielot | H04L 51/046 |
| | | | | 706/12 |
| 2016/0182421 | A1 * | 6/2016 | Mirski-Fitton | H04L 51/214 |
| | | | | 709/206 |
| 2017/0026328 | A1 * | 1/2017 | Adkins | H04L 51/42 |
| 2017/0208027 | A1 * | 7/2017 | Goldstein | H04L 51/226 |
| 2018/0020093 | A1 * | 1/2018 | Bentitou | G10L 13/00 |
| 2018/0097759 | A1 * | 4/2018 | Brechbuhl | G06F 16/24578 |
| 2018/0219820 | A1 * | 8/2018 | Kramer | H04L 61/5007 |
| 2019/0163545 | A1 * | 5/2019 | Singh | G06F 16/22 |
| 2020/0099636 | A1 * | 3/2020 | Arquero | H04L 51/04 |
| 2020/0195604 | A1 * | 6/2020 | Hassan | H04L 51/56 |
| 2020/0322301 | A1 * | 10/2020 | Goldstein | H04L 51/226 |
| 2022/0385615 | A1 * | 12/2022 | Robb | G06Q 10/107 |
| 2024/0356882 | A1 * | 10/2024 | Bradley | H04L 51/222 |

* cited by examiner

111

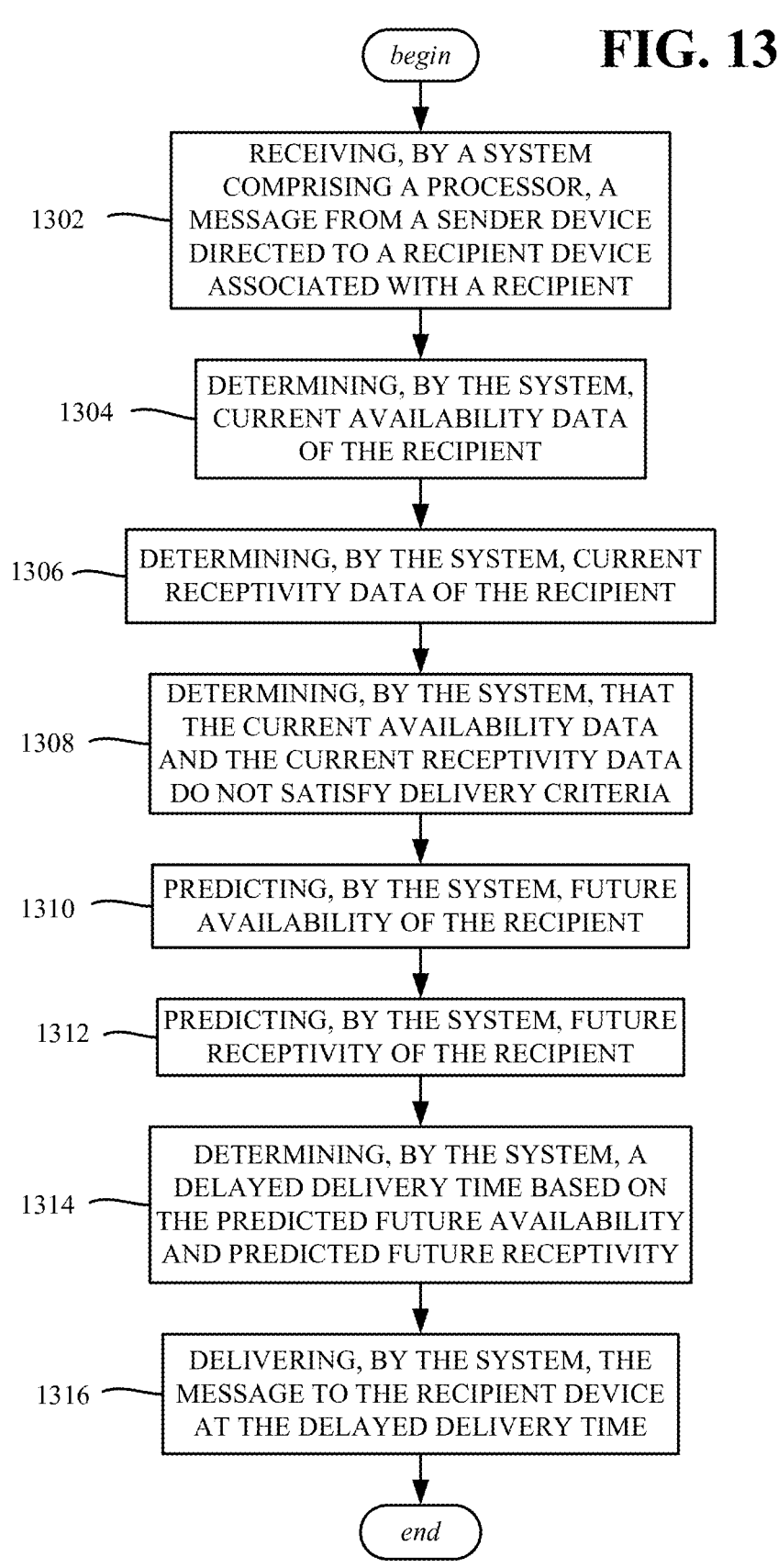

FIG. 13 begin

1302 — RECEIVING, BY A SYSTEM COMPRISING A PROCESSOR, A MESSAGE FROM A SENDER DEVICE DIRECTED TO A RECIPIENT DEVICE ASSOCIATED WITH A RECIPIENT

1304 — DETERMINING, BY THE SYSTEM, CURRENT AVAILABILITY DATA OF THE RECIPIENT

1306 — DETERMINING, BY THE SYSTEM, CURRENT RECEPTIVITY DATA OF THE RECIPIENT

1308 — DETERMINING, BY THE SYSTEM, THAT THE CURRENT AVAILABILITY DATA AND THE CURRENT RECEPTIVITY DATA DO NOT SATISFY DELIVERY CRITERIA

1310 — PREDICTING, BY THE SYSTEM, FUTURE AVAILABILITY OF THE RECIPIENT

1312 — PREDICTING, BY THE SYSTEM, FUTURE RECEPTIVITY OF THE RECIPIENT

1314 — DETERMINING, BY THE SYSTEM, A DELAYED DELIVERY TIME BASED ON THE PREDICTED FUTURE AVAILABILITY AND PREDICTED FUTURE RECEPTIVITY

1316 — DELIVERING, BY THE SYSTEM, THE MESSAGE TO THE RECIPIENT DEVICE AT THE DELAYED DELIVERY TIME end

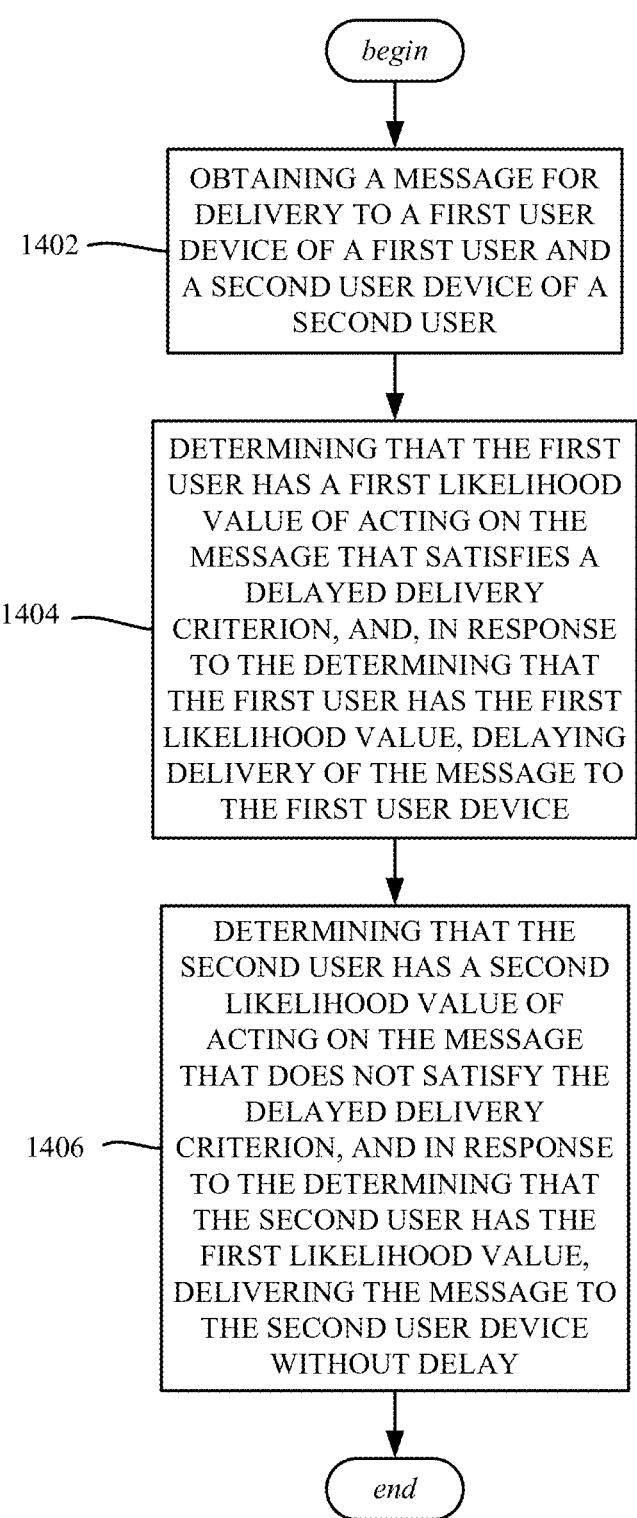

begin

1402 — OBTAINING A MESSAGE FOR DELIVERY TO A FIRST USER DEVICE OF A FIRST USER AND A SECOND USER DEVICE OF A SECOND USER

1404 — DETERMINING THAT THE FIRST USER HAS A FIRST LIKELIHOOD VALUE OF ACTING ON THE MESSAGE THAT SATISFIES A DELAYED DELIVERY CRITERION, AND, IN RESPONSE TO THE DETERMINING THAT THE FIRST USER HAS THE FIRST LIKELIHOOD VALUE, DELAYING DELIVERY OF THE MESSAGE TO THE FIRST USER DEVICE

1406 — DETERMINING THAT THE SECOND USER HAS A SECOND LIKELIHOOD VALUE OF ACTING ON THE MESSAGE THAT DOES NOT SATISFY THE DELAYED DELIVERY CRITERION, AND IN RESPONSE TO THE DETERMINING THAT THE SECOND USER HAS THE FIRST LIKELIHOOD VALUE, DELIVERING THE MESSAGE TO THE SECOND USER DEVICE WITHOUT DELAY end

MOBILE HANDSET

APPLICATIONS — 1506

CLIENT (STORE, DISCOVERY, PLAY) — 1546

TRIGGER COMPONENT — 1538

HYSTERESIS COMPONENT — 1536

SIP CLIENT — 1540

FIRMWARE — 1508

VIDEO COMP — 1530

DISPLAY — 1512

CAMERA — 1522

SERIAL I/O INTERFACE — 1514

USER INPUT — 1535

PROCESSOR — 1502

MEMORY — 1504

AUDIO I/O — 1516

SUBSCRIBER IDENTITY SYSTEM — 1518 / 1520

COMMUNICATION COMPONENT — 1510

CELL TCVR — 1511

WIFI TCVR — 1513

LOCATION COMPONENT — 1532

POWER SOURCE — 1524

POWER I/O — 1526

INTELLIGENT MESSAGING DELIVERY

This application is a continuation of U.S. patent application Ser. No. 17/814,688, filed on Jul. 25, 2022, now U.S. Pat. No. 12,028,309, which is herein incorporated by referenced in its entirety.

TECHNICAL FIELD

The subject application relates to the delivery of information in general, and more particularly to delivering one or more messages to a user based on user-related status data, and related embodiments.

BACKGROUND

Contemporary users of electronic communications can be sent messages that are often received at inconvenient times. Existing "do not disturb" features and the like generally only provide basic control over such message delivery. Further, such features need to be carefully invoked and managed by the user, because they require the user to actively engage and disengage them.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 13 is a flow diagram representing example operations related to delivering a message to the recipient device at a delayed delivery time based on the recipient's predicted future availability and predicted future receptivity, in accordance with various aspects and embodiments of the subject disclosure.

FIG. 14 is a flow diagram representing example operations related to delivering a message to two users at different times, including one at a delayed delivery time, in accordance with various aspects and embodiments of the subject disclosure.

DETAILED DESCRIPTION

Figure 1:
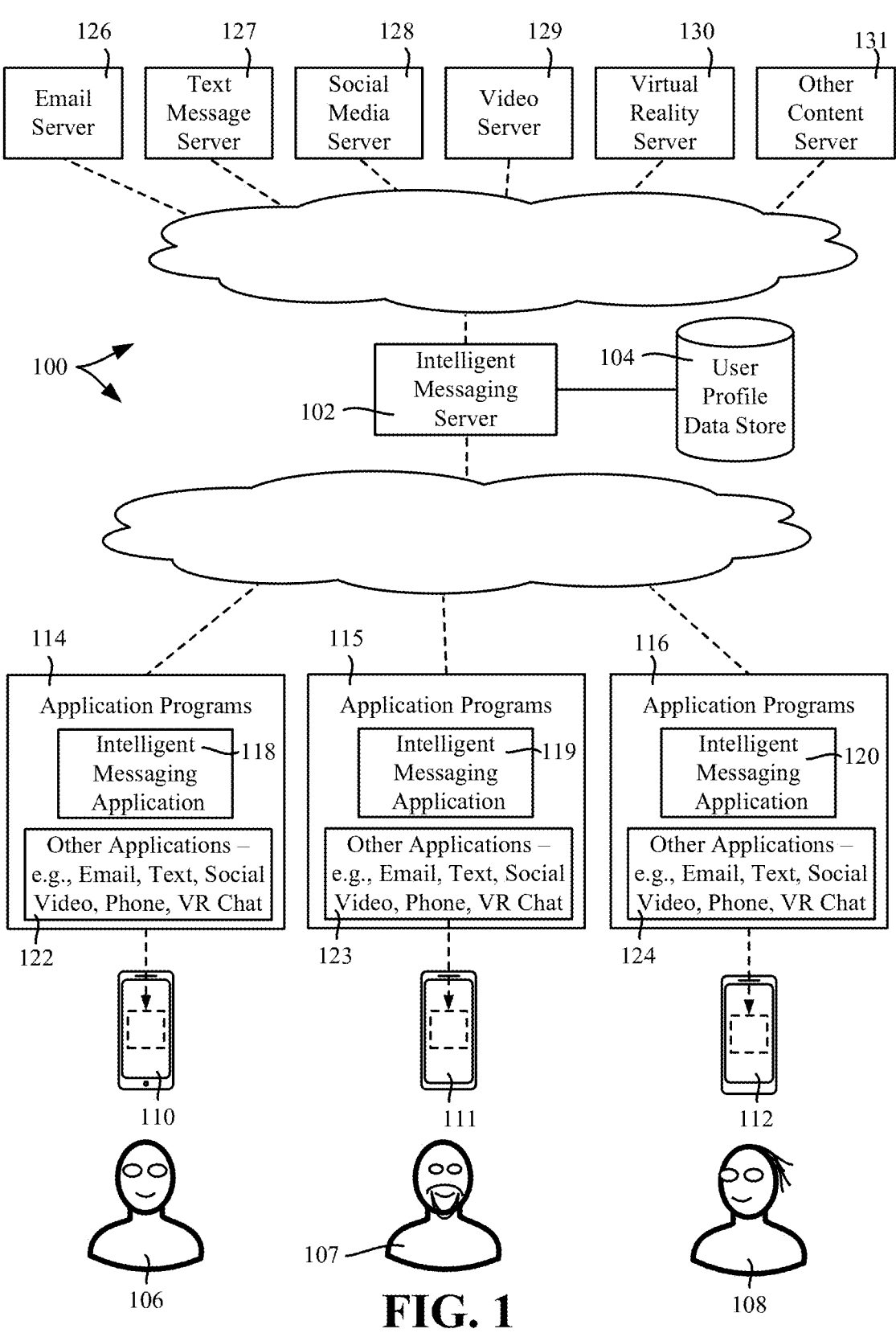
FIG. 1 is a block diagram of an example system for intelligent delivery of messages based on recipient-related information, in accordance with various aspects and embodiments of the subject disclosure.

The technology described herein is generally directed towards managing incoming electronic messages on behalf of a user, which can include when and how they are delivered. The technology described herein provides an intelligent way for a service to determine when to deliver messages to a recipient, and gives the sender options and feedback as to the status and timing of the delivery.

The technology described herein provides users with adequate control over when electronic communications that are sent to them are delivered and available for presentation to them. This is in contrast to existing "do not disturb" features and the like, in that the technology described herein accounts for a user's frequent changes in availability and receptivity to acting on (reading/viewing and/or responding to/discarding/archiving, etc.) messages received, e.g., during a day or other timeframe. Indeed, users often have changes in availability, as well as receptivity, with respect to acting upon a message, which can vary minute-to-minute and/or without the user actively recognizing such change(s). The technology described herein can automatically manage the delivery of even a high volume of messages sent to users.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system/architecture 100 including an intelligent messaging server 102, which evaluates messages to be delivered to users with respect to the user's likelihood of acting on each message based on user status, e.g., the user's predicted availability and/or receptivity. Thus, various factors including recipient availability and receptivity, along with the content (e.g., including its size) of a message and the identity of the message sender, can be consider considered with respect to when, and possibly how, to deliver the message. User profile data in a user profile data store 104 can be used in the determination of whether delivery of a given message is to be with or without delay.

Any number of users (three such users 106-108, with communications devices 110-112, respectively, are depicted in the example of FIG. 1) can be equipped with application programs, e.g., 114-116, respectively. The application programs 114-116 shown in the example of FIG. 1 include intelligent messaging application programs 118-120, respectively, and other various messaging applications 122-124 that relate to sending and receiving messages, such as including messaging applications for emails, texts, social, video, phone, virtual reality (VR) chat and others (not explicitly listed, e.g., instant messaging, workplace communication tools and so forth). Not every user need have the same messaging applications installed, and/or additional or different messaging applications may be installed. The messaging applications 122-124, via the intelligent messaging application programs 114-116, are coupled to communicate with the intelligent messaging server 102 in this example.

In turn, the intelligent messaging server 102 is coupled to the various servers 126-131 (representing messaging-related services) accessible over a network that support the messaging applications 122-124. In this way, any messages that are to be delivered to a user can be analyzed by the intelligent messaging server 102 and delivered in an intelligent way as appropriate, although it is noted that a user has various options to retain overall control of message delivery, as described herein. In this way, an intelligent messaging application and server may exist as an intermediary between the messaging application 122-124 and the messaging servers 126-131. Each intelligent messaging application and/or the server 102 may serve, among other purposes, to monitor the availability and receptivity of users to receiving messages. Each intelligent messaging application and/or the server 102 may also serve to determine, manage, and deliver messages at times, e.g., as determined by artificial intelligence, machine learning and/or other technologies.

Figure 2:
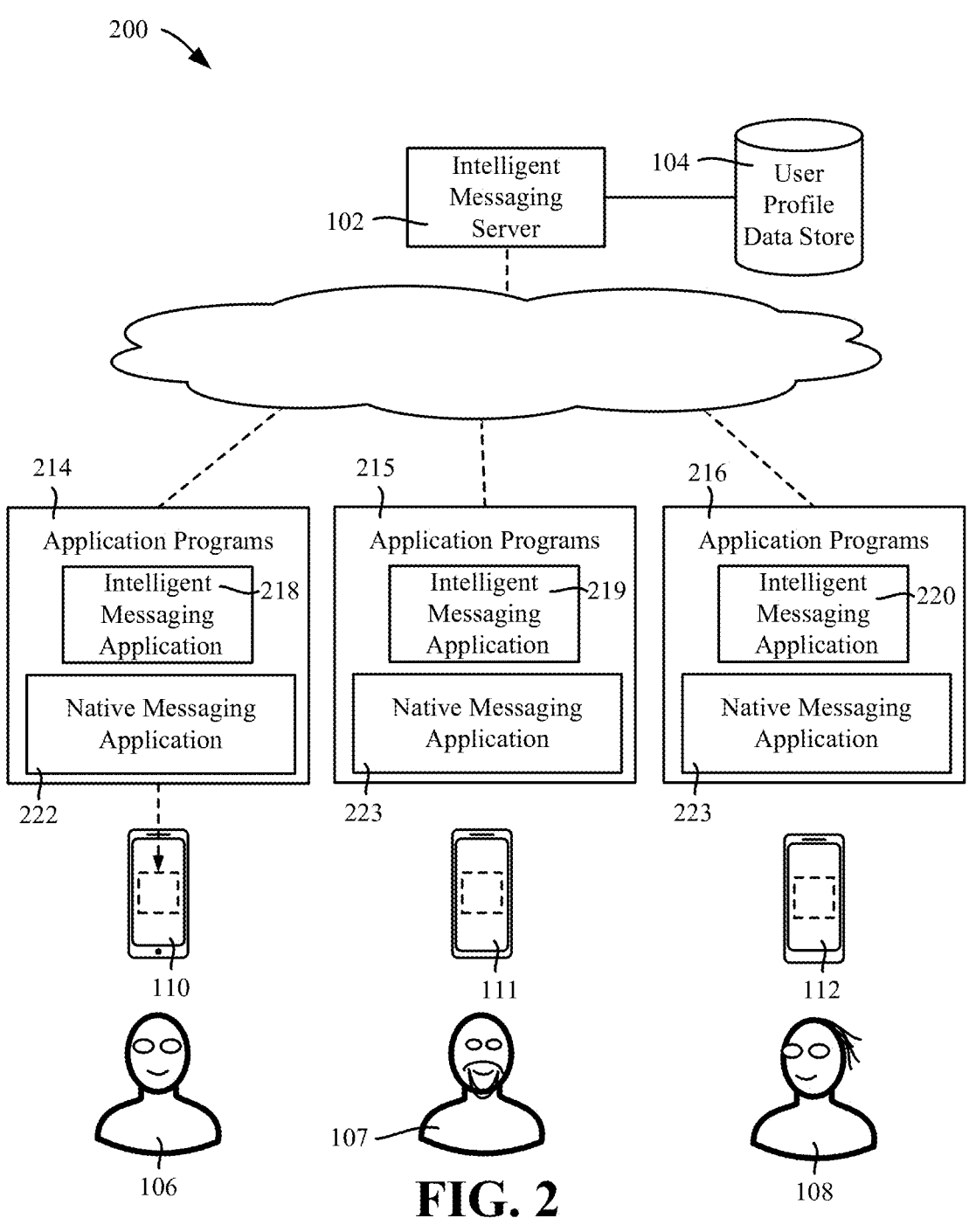
FIG. 2 is a block diagram of an example alternate system for intelligent delivery of messages based on recipient-related information, in accordance with various aspects and embodiments of the subject disclosure

An alternative environment/architecture such as shown in FIG. 2 on may exist in which the intelligence is presented within a single application, e.g., intelligent messaging applications 218-220 that are part of the depicted sets of application programs 214-216, respectively. In this manner, the same level of intelligent messaging may be provided, but in this case, it is for native messaging application 222-224 as opposed to serving the role across a number of different types of messaging services for the users. For example, consider a customer management application with features that control when output is presented to a user; the customer management application instead can manage delivery of messages.

Each user may establish user profile data (e.g., maintained in the data store 104 of FIGS. 1 and/or 2) that governs each of the intelligent messaging server's application of the service to the user. As generally represented in the user interface 336 of FIG. 3, profile settings may be separately set for each of the different messaging services.

Figure 3:
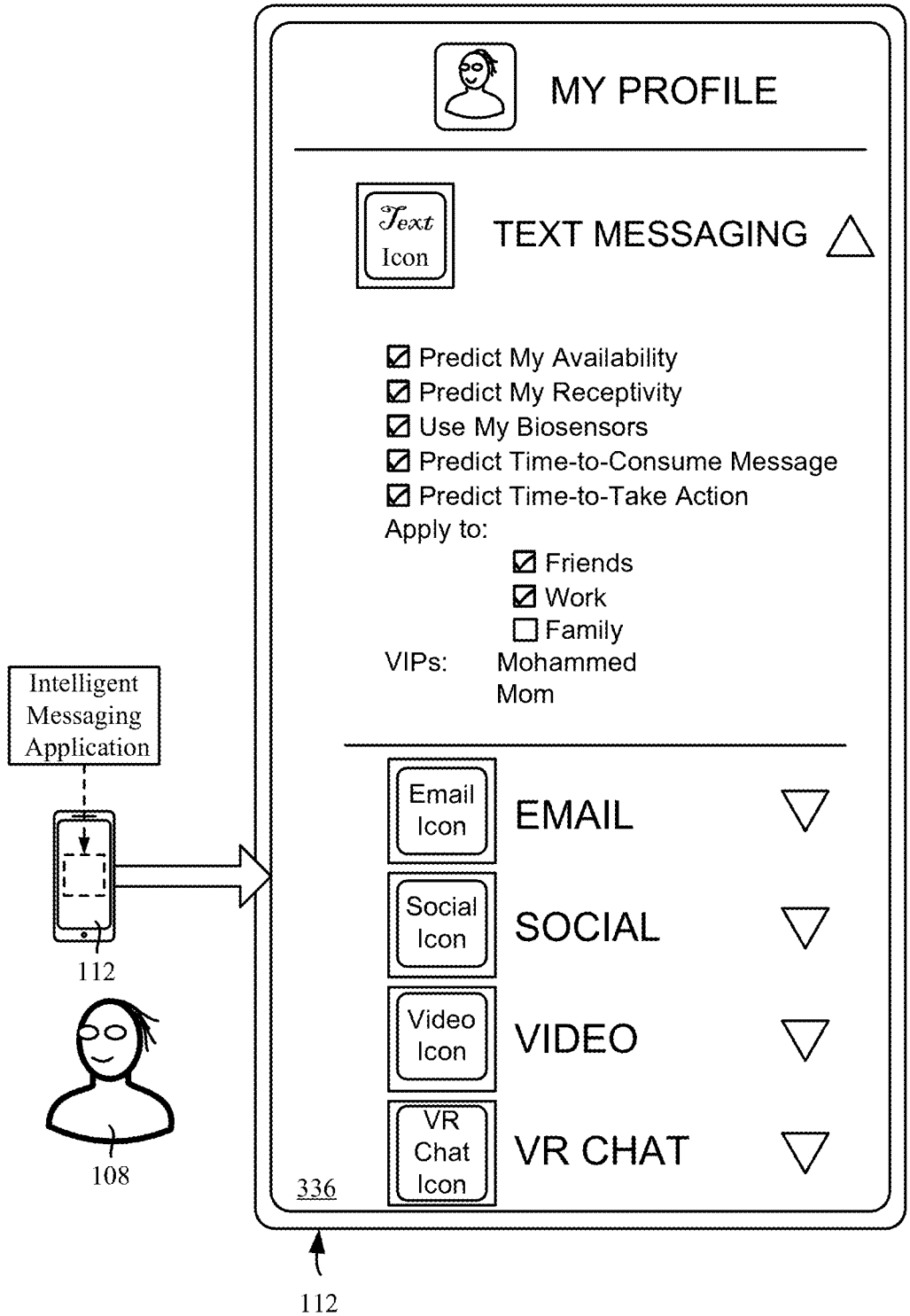
FIG. 3 is an example representation of a user interface for inputting profile data to govern an intelligent messaging server, in accordance with various aspects and embodiments of the subject disclosure.

Profile settings may include settings for features such as those shown, as described herein. For this example, the settings of the user 108 for the text messaging application are shown and are used herein to demonstrate how text messages sent to the user 108 are processed by the intelligent messaging server 102 (FIG. 1). Such settings can include, for example, whether the user wants his or her availability predicted, whether the user wants his or her receptivity predicted, whether to user sensor(s), whether to predict and so on, as well as to whom to apply the settings and any "VIPs" that can receive different treatment (e.g., no delay) for their messages. Other messaging applications can have similar user-controllable settings that are appropriate for each such messaging application. As can be readily appreciated, the settings shown in FIG. 3 are only some non-limiting examples, and other settings (e.g., how aggressive to be in deciding whether to delay, a maximum delay time, and many possible others) can be made available in other embodiments.

Figure 4:
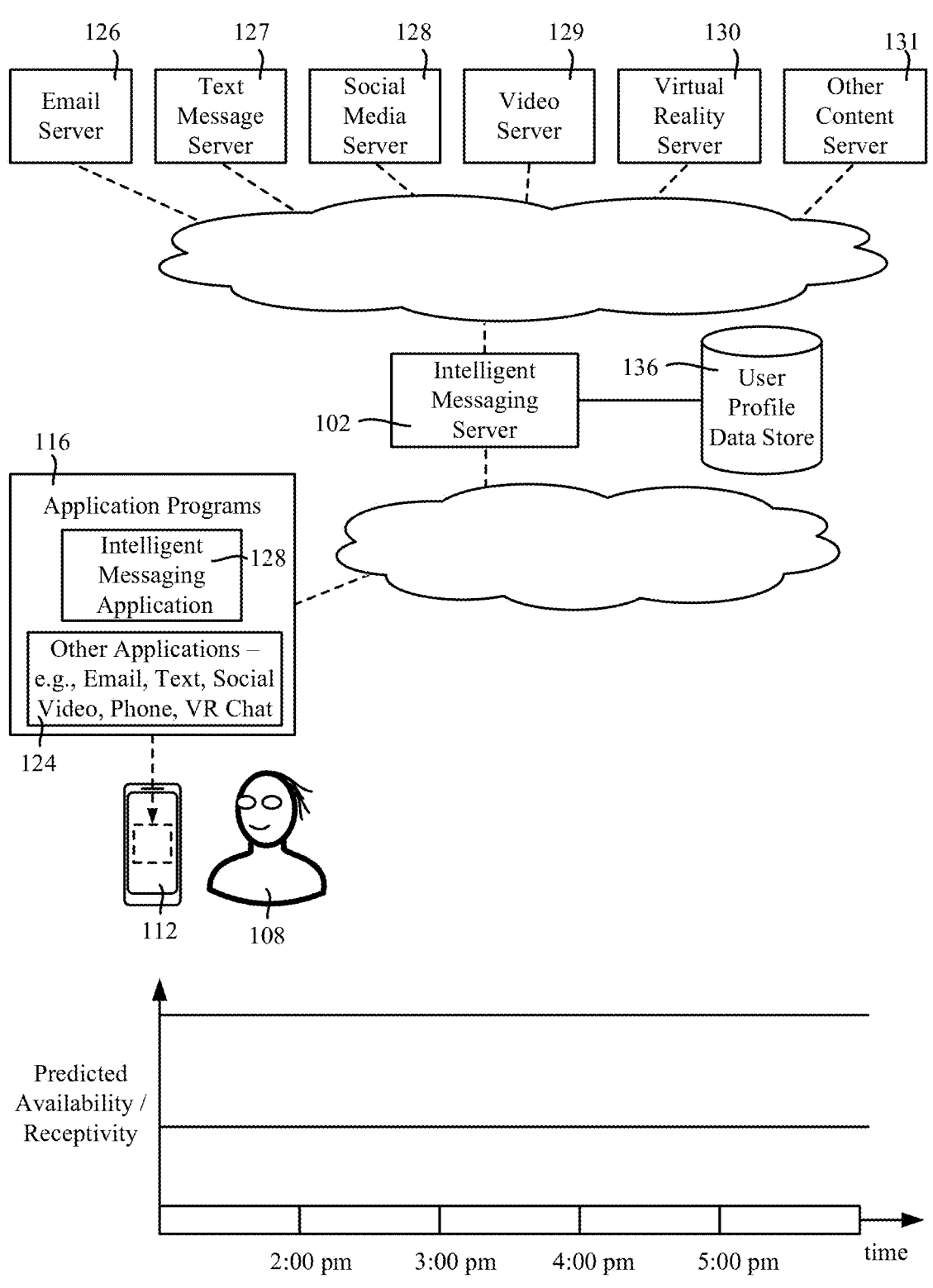
FIGS. 4-6 are example representations of determining/predicting a user's availability and receptivity with respect to acting on delivered messages, in accordance with various aspects and embodiments of the subject disclosure.
Figure 5:
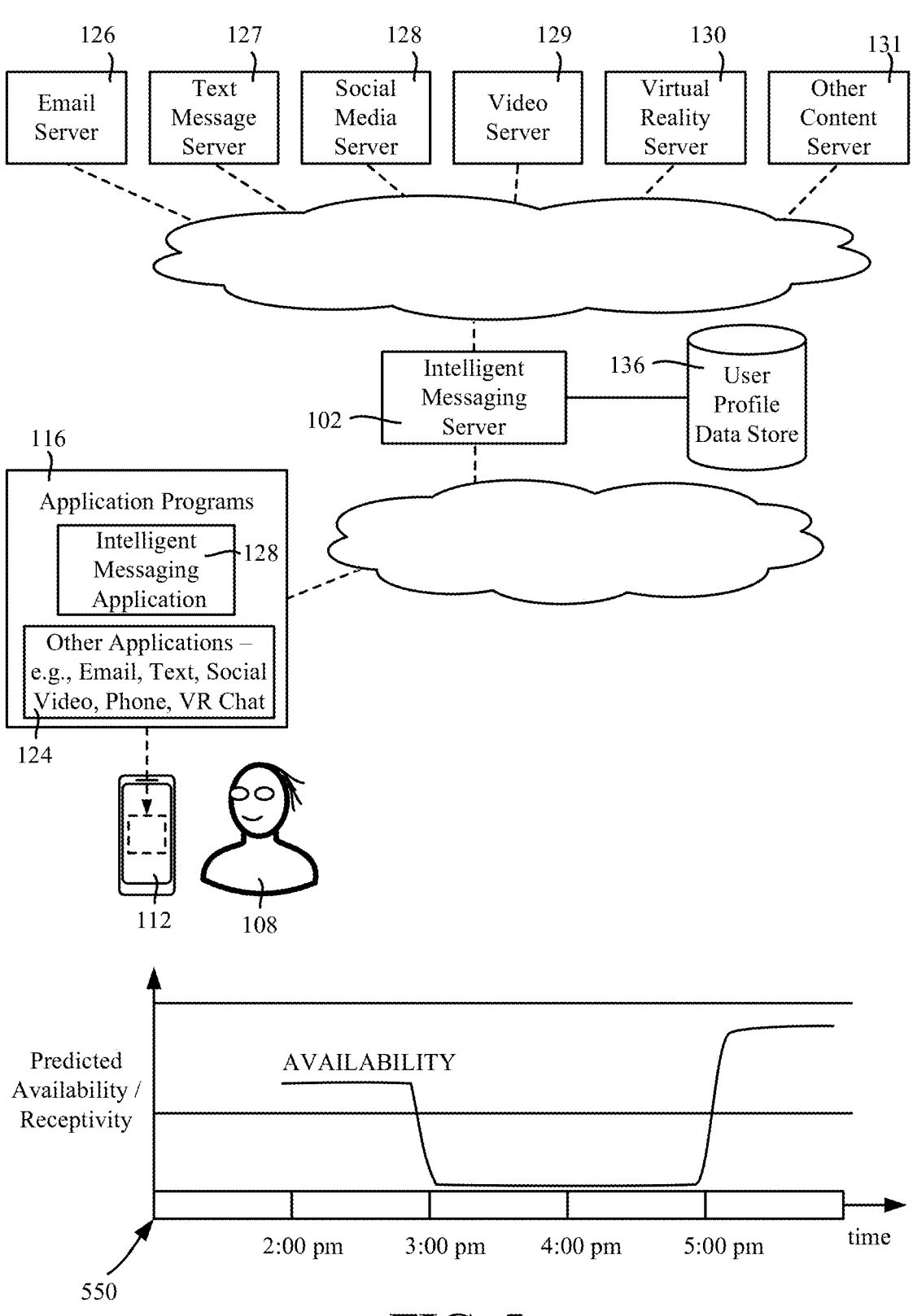
Figure 6:
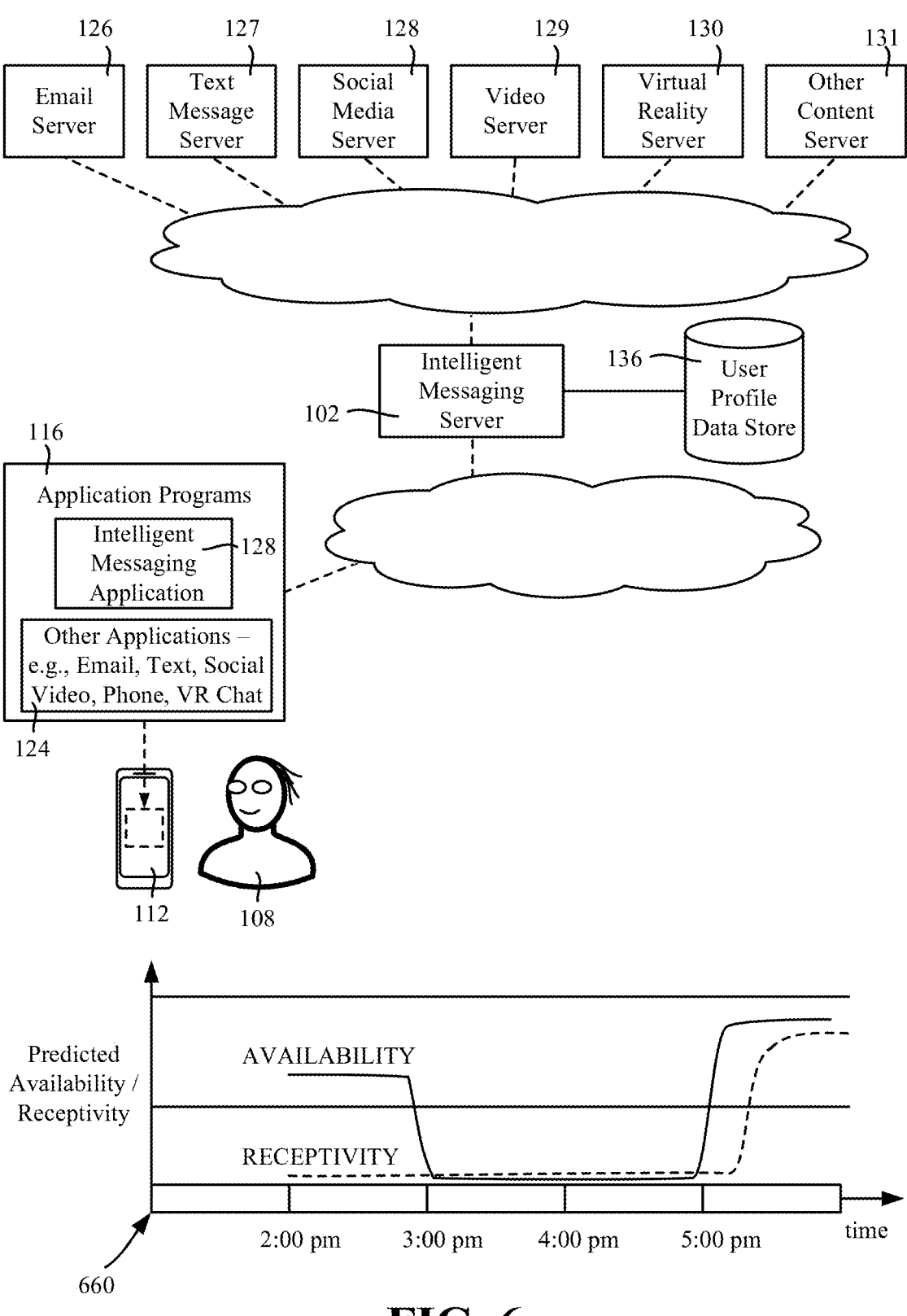

Turning to recipient monitoring, when the user 108 has activated her profile data in the intelligent messaging server 102, the intelligent messaging application 128 may be used to monitor the status of the user 108 so as to be used to determine how and when to deliver messages to her. As generally represented in FIGS. 4-6, the availability and receptivity of the user 108 with respect to receiving messages may vary over time, and can be predicted by the intelligent messaging server 102 (and/or application 128). Moreover, the intelligent messaging server 102 can serve the role via the intelligent messaging application 128 to monitor her status so that she does not need to actively engage and disengage any type of "do not disturb" mechanism, (although she may wish to do so independently). Rather, the intelligent messaging application 128 and/or server 102 actively serve as an agent to determine when the user 108 may be "disturbed" by delivering a message to her, or deliver some messages while delaying others.

The availability of the recipient user 108 may be monitored and predicted over time, as generally represented by the example time versus prediction graph 550 of FIG. 5. A user's availability may be predicted based on a number of factors including, but not limited to, data that the intelligent messaging application 128 can retrieve such as calendar event data, biometric sensor data, other sensor data, active apps data, location data, other user's proximity data and/or historical availability data. Availability data is also feasible for a user to input manually, (notwithstanding that the technology described herein generally operates to avoid the need for manual interaction once the profile data is input for a messaging application). These various data may be combined and analyzed using any of a number of technologies to determine a predicted availability score for the user 108.

By way of example, if a message is sent to the user 108 at 2:00 PM, the availability of the recipient user 108 may be predicted (or already has been predicted) at that point in time. Indeed, the availability of the recipient user 108 to receive a message also may be predicted at times into the future if it is determined that the availability of the recipient user 108 at the time of arrival of the message is not suitable for delivery. Availability prediction can be based on any combination or all of the following non-limiting examples, including calendar event data—e.g., active calendar events at the time may indicate low or zero availability, biometric sensor data—e.g., if the user is detected to be asleep or in a workout, zero availability may result, location data—e.g., if the user is detected to be at a vacation destination, zero or slight availability may result, and so on.

The receptivity of the user 108 also may be monitored and predicted over time, as generally represented by the example time versus prediction graph 660 of FIG. 6, which along with predicted availability (the solid line) also shows predicted receptivity (the dashed line) over time. Receptivity may be predicted based on a number of factors including data that the intelligent messaging application 128 can retrieve such as, but not limited to, calendar event data, biometric sensor data, other sensor data, active apps data, location data, other user's proximity data and/or historical availability data. These various data may be combined and analyzed using any of a number of technologies to determine a predicted receptivity score for the user 108.

For example, if a message is sent to the user 108 at 2:00 PM, the user 108's receptivity may be predicted at that point in time. The user 108's receptivity to receive that message may also be predicted at times into the future if it is determined that the user 108's receptivity at the time of arrival of the message is not suitable for delivery. Some non-limiting examples may include the use of biometric sensor data—e.g., if the user is detected to be exercising, zero receptivity may result, and/or active apps data—e.g., if the user is detected to be actively using another application program, low or zero receptivity may result. This example may include, for instance, the detection of a user who is "in the zone" working in an application for a threshold amount of time. As another example, proximity data to other user(s) can be evaluated; e.g., if the user is detected to be within a proximate location to another user or in conversation with another user (e.g., as detected via microphone sensor), the user's receptivity level may be low.

With respect to message delivery determination, a combination of the user 108's availability and receptivity may be used to determine a likely "best" time to deliver a message to the user. Moreover, the user profile may indicate that their availability and receptivity levels may differ based on who is sending the message. For example, the user 108 may set her receptivity threshold lower for family than for work during working hours or when the user 108 is determined to be at work via location data. The user 108 also may set may set her receptivity threshold at a very high level for work during weekends, for example.

A VIP sender, such as a boss, and important client or a spouse, may have no delivery delay for messages, or possibly at most some limited maximum delay. This may be different per messaging application as set in the user profile data; e.g., a text message or phone call from a boss or important client may have no delay, but a social media posting by those same persons may not be considered significant with respect to acting quickly; e.g., they would be identified as VIPs in the text and phone messaging applications, but would not be VIPs in the social messaging application(s).

Historical data may be particularly useful in predicting future levels of receptivity. For example, if a user typically does not act on a message within twenty-four hours for messages received from work contacts over the weekend, then the receptivity score for any such incoming message received from a work contact during the weekend in the future would (likely, as adjusted as more data is obtained) be very low, based on the historical data, until weekday hours occur. Historical data can be regularly learned and updated as a user's behavior changes.

Figure 7:
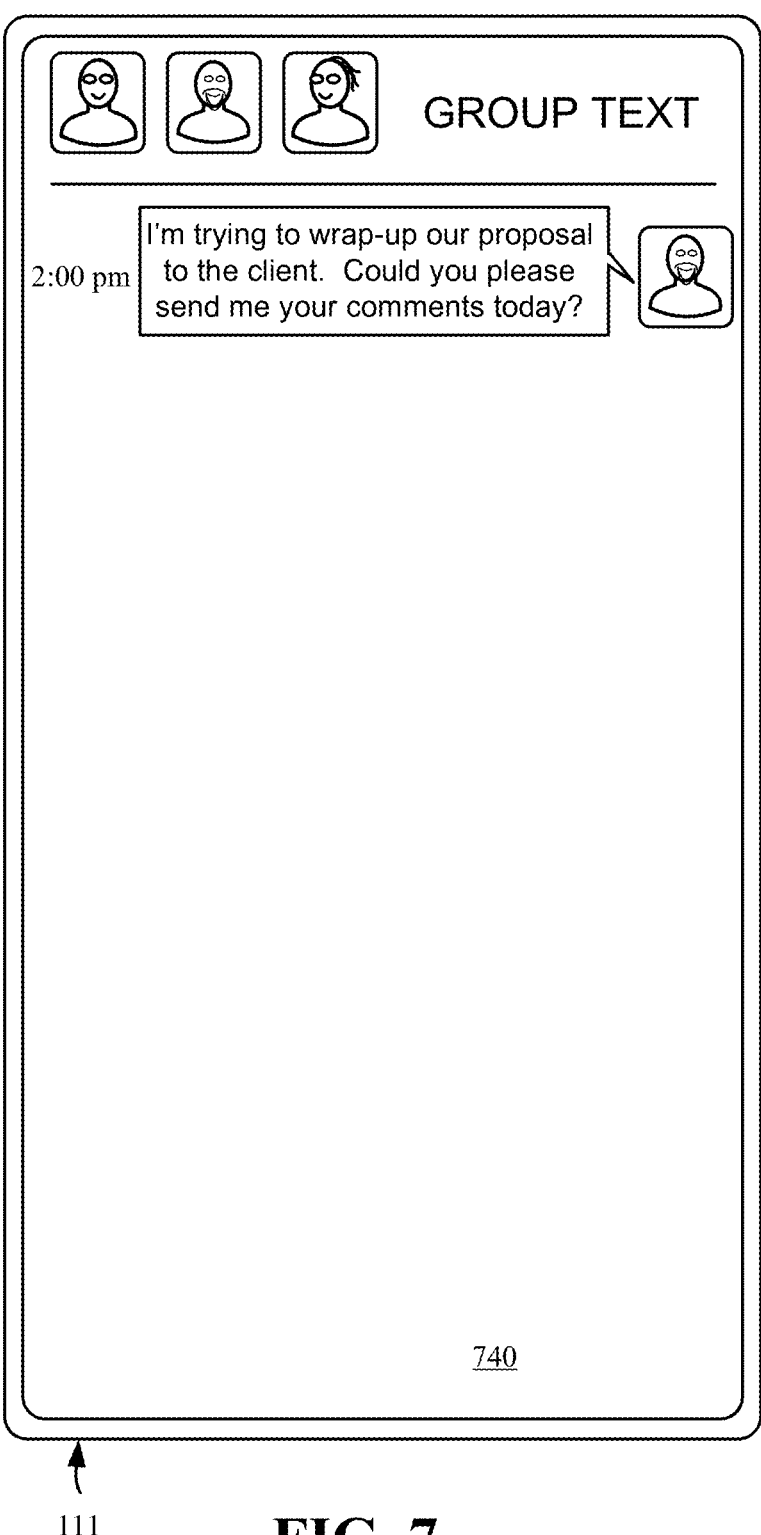
FIG. 7 is an example representation of a user interface that displays message sent information to be evaluated for delivery by an intelligent messaging server, in accordance with various aspects and embodiments of the subject disclosure

Consider an example in which a message is sent from a user (such as from the user 107 as shown in FIG. 7 via the user interface 770 on the user device 111) to one or more other users, e.g., the users 106 and 108. The message may be analyzed by the intelligent messaging server 102, which has access to the user profile data of the users 106 and 108 to whom the message has been sent.

Figure 8:
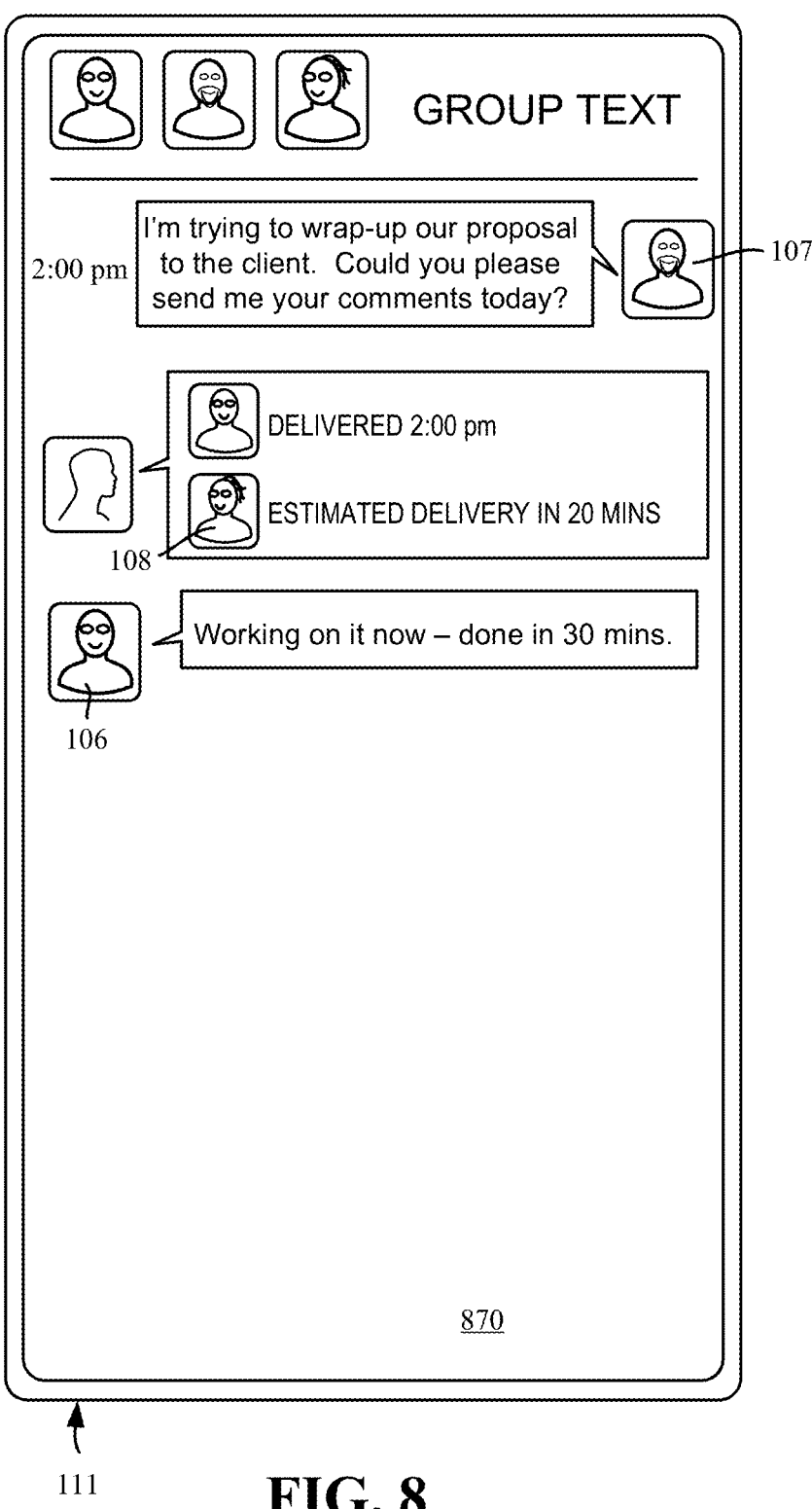
FIG. 8 is an example representation of a user interface that displays message delivery information based on status data of two example recipients, in accordance with various aspects and embodiments of the subject disclosure.

The intelligent messaging server 102 is capable of determining the real time availability and receptivity of each of the other users 106 and 108. In the example shown via the updated user interface 870 depicted in FIG. 8, the user 106 has a high level of availability and a high level of receptivity. The message thus may be delivered to her without delay, and a notification may be returned to the sender indicating that the message was delivered without delay; in this example, the user 106 is shown as having already responded. The user 108 may have a low level of availability and/or receptivity, and therefore the intelligent messaging server 102 determines that the message should not be delivered to the user 108 immediately, but rather with some delay, which the intelligent messaging server 102 estimates to be twenty minutes. The sender 107 may be notified of this as well, and the sender 107 may further be notified of the estimated delivery time (delayed twenty minutes) for the message to be delivered to the user 108.

The intelligent messaging server 102 may use a recipient user's past usage trends to predict action-related time data (a time-to-consume prediction and a time-to-take-further-action prediction, e.g. time to respond) by the recipient for each incoming message. For example, using the initial message in the example shown in FIG. 8, the intelligent messaging server may use technologies such as artificial intelligence/machine learning or other techniques to analyze the message and determine a prediction time as to how long it will likely take each recipient user to consume (e.g., read) that particular message. Such a predicted time-to-consume for a given message may vary by each recipient user, based on how long it has taken each of them to consume messages of similar length and complexity in the past. The example message shown is a relatively simple and short one, whereby the intelligent messaging server 102 may deliver it to a recipient, even if the recipient has a relatively short predicted upcoming high availability and receptivity window. In one embodiment, there may be multiple models trained for different formats (e.g., text, video, voice mails, virtual reality communications and/or the like) or for different contexts (e.g., work, personal, family, emergency, civil and/or the like) of message content that may return different prediction time values according to the format and context of the message.

Figure 9:
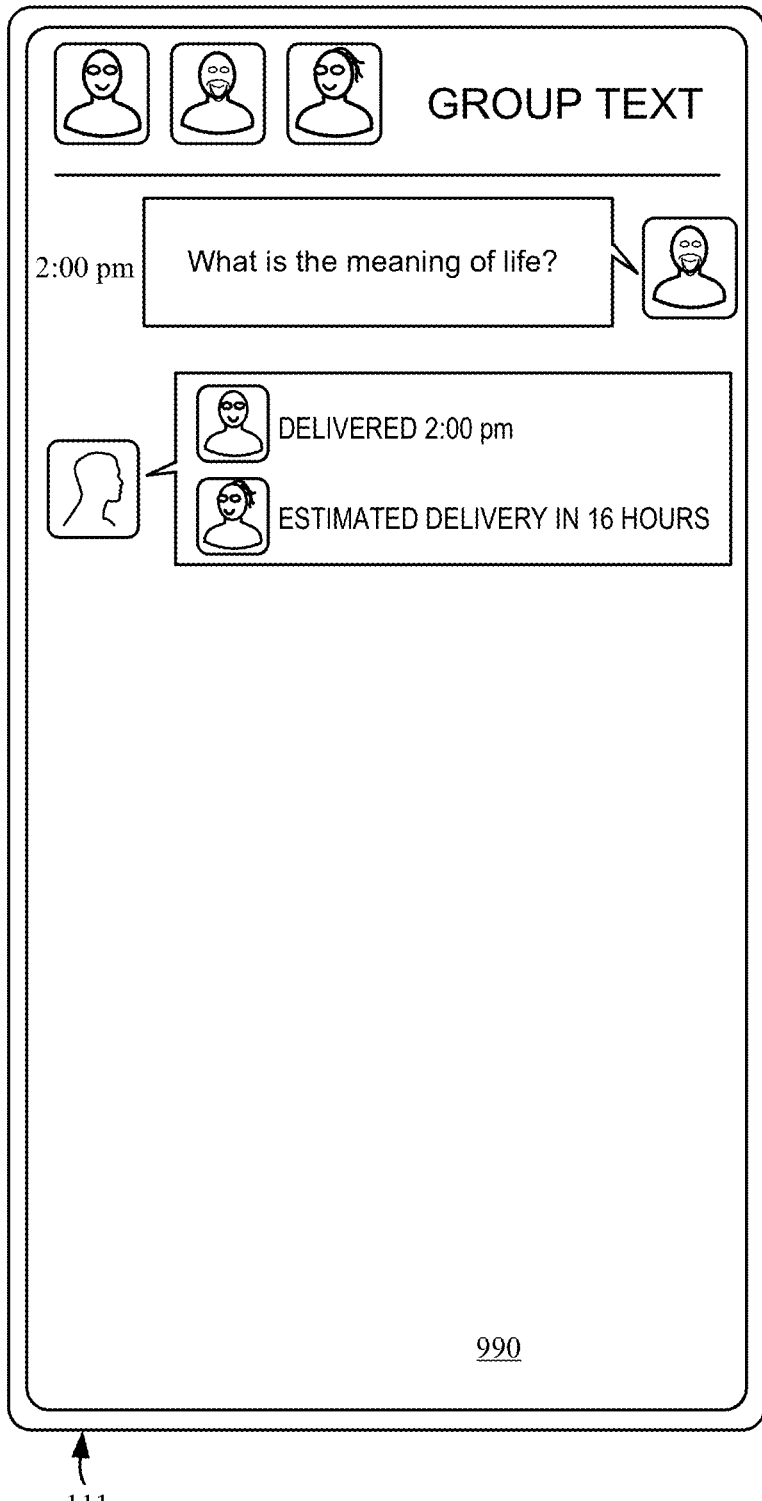
FIG. 9 is an example representation of a user interface that displays message delivery information based on message content and status data of two example recipients, in accordance with various aspects and embodiments of the subject disclosure.

On the other hand, consider a simple "yes" or "no" response to one message versus a complicated response to another message, such as response needing research, or a response to the message in the form of question as shown in the user interface 990 of FIG. 9. Such a message as depicted in the example of FIG. 9 would have a likely complicated, speculative, contemplative answer, should the message recipient take it seriously. If the predicted time to consume and/or the predicted time to act on the message, as determined by the intelligent messaging server 102, indicate that the message is a lengthy one to read, or imply that creating a response to the message will likely be time consuming, the delivery may be delayed for a longer time, particularly if the recipient's predicted upcoming availability/receptivity window is short. In this manner, for example, a message will not be delivered to a user if the user has little opportunity to consume the message and/or act upon it in the immediate future, and the message has been determined to be such that it would take a long time to consume and/or further act upon.

If a receiving user maintains a low receptivity and availability level over a period of time, a number of messages that have been sent to them may be delivered as a batch when their receptivity and/or availability reaches a threshold level. There can be a threshold level for availability, for example, as well as a threshold level for receptivity, and one or both may satisfy the one or more delivery criterion to no longer delay delivery and send the messages. User preference data in the profile settings data, or default data, may determine the threshold levels, and whether the availability threshold level, receptivity threshold level or both threshold levels need to satisfy the one or more delivery criterion. Further, receptivity and/or availability may change at any time; for example a meeting may get canceled, end early and so forth whereby the user can have his or her predicted receptivity and/or availability updated. As one example, if the calendar data for a user indicates the user is likely unavailable to act upon delivered messages because of an important meeting, but the user begins responding to messages and/or interacting with other application programs, for some reasonable threshold amount of time during the scheduled meeting time, the system can recognize that the meeting is likely not occurring, whereby delayed messages can be delivered without further delay, or at least have their delivery time shortened.

Figure 10:
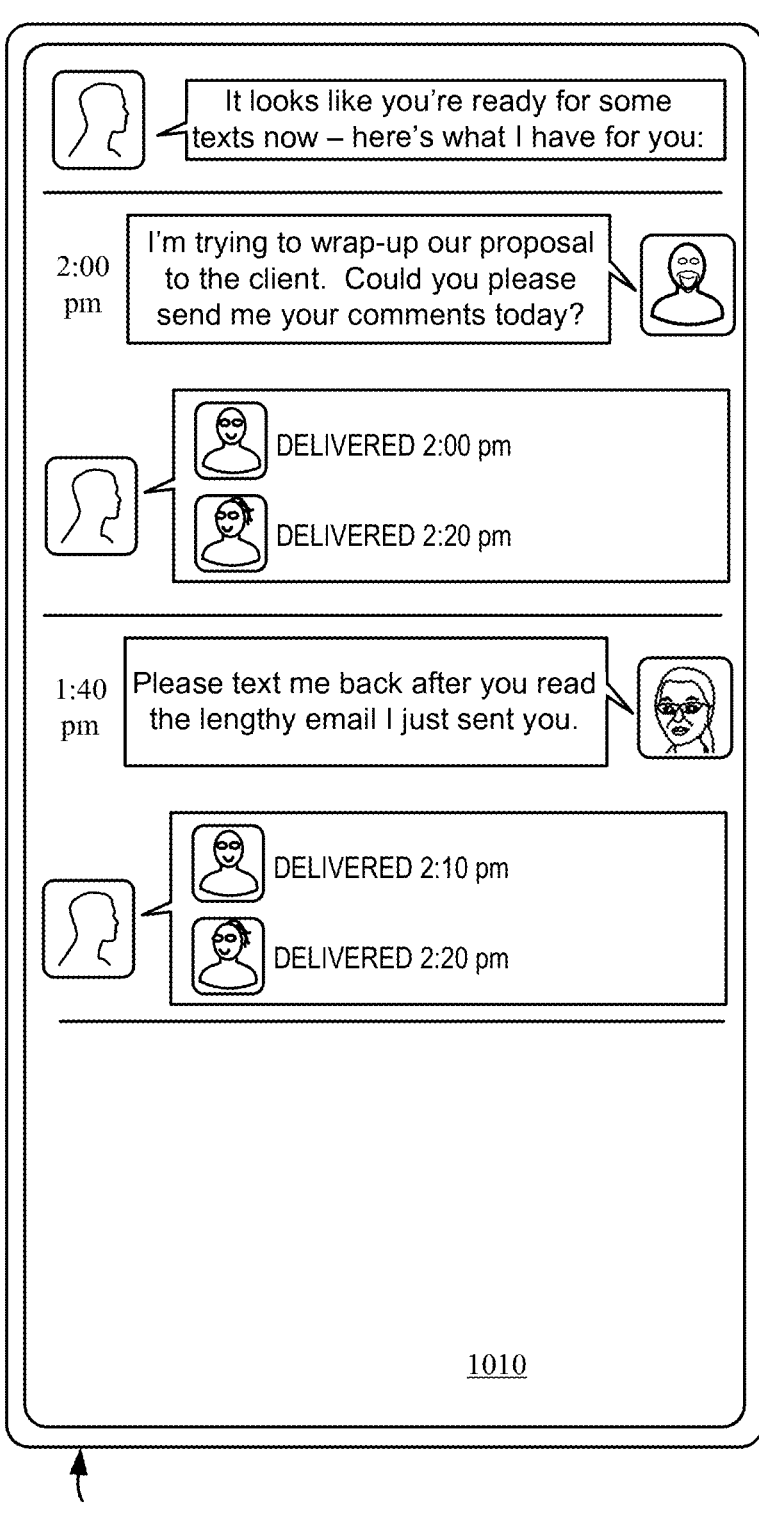
FIG. 10 is an example representation of a user interface that displays a batch of delivered messages and their associated delivery status data, in accordance with various aspects and embodiments of the subject disclosure.

For a batch of waiting messages that are delivered in the batch, such as represented in the user interface 1010 of FIG. 10, the intelligent messaging server 102 may present them in a priority order using one or more factors which may include, for example, the predicted time-to consume and time-to-respond or take further action upon for each message. In this manner, the user may be presented with the higher priority messages in the batch first, or the quickest ones to consume and act upon first, or use other criteria to determine the order in which the batch is presented. In any event, this may result in the batch of waiting messages being presented out of order from the time in which they were originally sent.

It should be noted that a user may be notified of delayed message delivery instead of receiving the message, and/or can override receiving delayed messages at a later time to receive them now, or at some user-indicated future time. For example, consider that a user has a canceled meeting, which, for whatever reason, has not been determined by the server as having been canceled, or the user profile data does not allow consideration of such an updated factor. In any event, delayed message delivery is pending. In one embodiment, a user can interact to indicate, via the intelligent messaging application to the intelligent messaging server that any delayed messages can be delivered now, or at least sooner than estimated. In a related embodiment, if the user chooses to interact or receive messages in a predicted low availability or low receptivity period, she or he may do so but the machine learning model can be instructed to not identify this instance as a moment of availability. Effectively, this activity allows the user to peek into the queue of messages to be delivered (and optionally act on some messages if desired) but to maintain the overall appearance of low receptivity such that her or his designated "do not disturb" interval does not become erratic or unreliable. This embodiment accommodates the review of a message queue for important content that was not originated from a VIP sender, for example, such as when a mid-level manager is on vacation but wants to prevent any critical failures of her or his responsible applications.

Alternatively, (or in addition to manual interaction), the user can be sent, including periodically or without delay, a simple, easy-to-act upon summary message or the like that indicates that there are message(s) with delayed delivery waiting to be delivered. This summary message may be possibly in the form of a list of pending messages (e.g., sender, time sent, first line or subject line) with an estimated delivery time for each pending message. Summary message delivery can be optionally selected as a user preference as maintained in the user's profile data, for example. A user can interact with such a summary message to override or modify the delay time, for example. If a list of pending messages is presented, the user can interact with each one individually.

Figure 11:
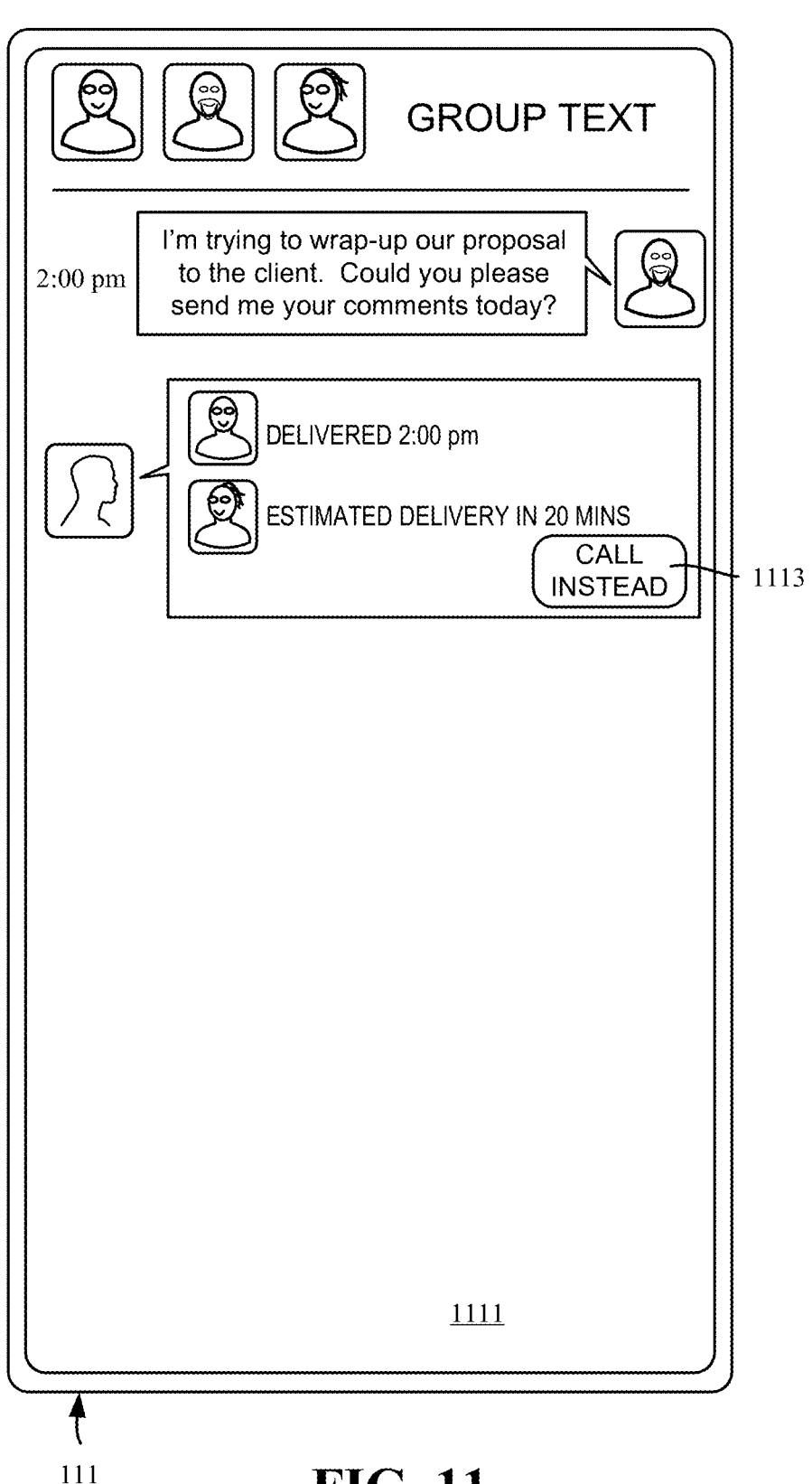
FIG. 11 is an example representation of a user interface that displays a notification to the sender of delayed message delivery and provides interactive ability to use an alternative communication channel, in accordance with various aspects and embodiments of the subject disclosure.

In the event that delivery of a message is delayed, the sender also will likely benefit from a notification of the estimated delivery time. For example, as shown in FIG. 11, (as well as in FIG. 8), when the initial message delivery is expected to be delayed to one or more of the recipients, the intelligent messaging server 102 sends a notification to the sender with respect to the delivery result and/or estimated delayed delivery time. The intelligent messaging server 102 may present an opt-out option to the sender, which may result in a cancellation of that message to that recipient.

Alternatively or in addition to the delay notification, the sender may be presented by the intelligent messaging server 102 with an option to switch to another means of messaging. For example, as shown in FIG. 11 via the interactive control 1113, if delivery of a text message (in this example) is set to be delayed, the sender may be presented with an option to call the recipient instead, or communicate in some other way with the recipient, such as via email, instant messaging, a text to a different (e.g., personal) device of the recipient, or the like. Such a selection can result in the intelligent messaging application initiating a call via a phone application to that recipient from the sender's device, for example. If the device is not capable of making a call, such as a tablet that is not equipped with phone capability, the device can instead access contact data and present the telephone number of the intended recipient along with a prompt to call. Calendar data can also be updated, e.g., so as to present a reminder to contact the recipient in some way shortly in the future, particularly if the delay is estimated to be lengthy.

Further, the intelligent messaging server 102 may know something about the recipient's current status. For example, if the text message is delayed, but the server knows the recipient user is at present actively responding to email messages, the option may be to email the recipient instead of waiting for delayed delivery.

Figure 12:
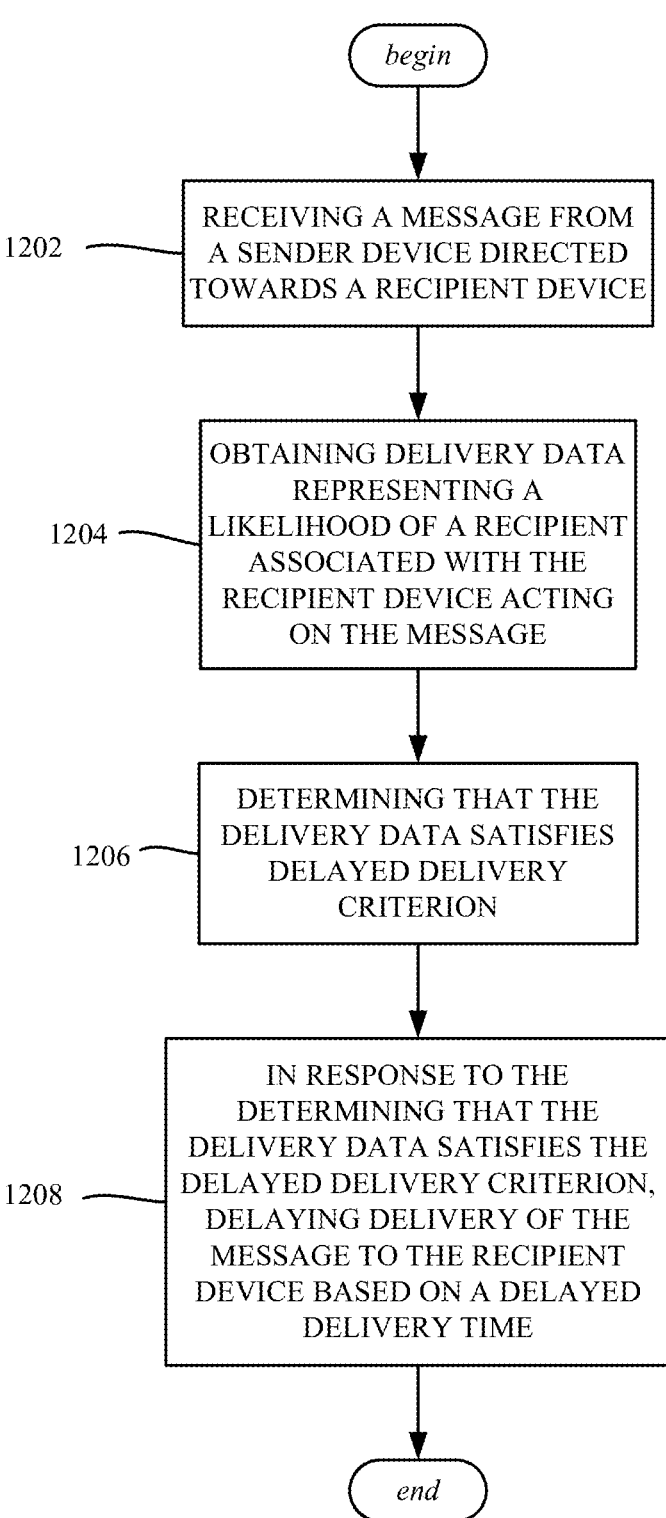
FIG. 12 is a flow diagram representing example operations related to delaying delivery of a message to the recipient device when a delayed delivery criterion is satisfied, in accordance with various aspects and embodiments of the subject disclosure.

One or more example aspects are represented in FIG. 12, and can correspond to a system, including a processor, and a memory that stores executable instructions that, when executed by the processor, facilitate performance of operations. Example operation 1202 represents receiving a message from a sender device directed towards a recipient device. Example operation 1204 represents obtaining delivery data representing a likelihood of a recipient associated with the recipient device acting on the message. Example operation 1206 represents determining that the delivery data satisfies delayed delivery criterion. Example operation 1208 represents, in response to the determining that the delivery data satisfies the delayed delivery criterion, delaying delivery of the message to the recipient device based on a delayed delivery time.

Determining the delayed delivery time can be based on at least one of: current receptivity data and current availability data of the recipient.

Further operations can include delivering the message to the recipient device based on the delayed delivery time.

Obtaining the delivery data can include determining current availability data of the recipient.

Determining the current availability data of the recipient can include predicting availability of the recipient based on at least one of: time data, calendar event data, biometric sensor data, other sensor data, active application data, location data, other user proximity data, or historical availability data.

Obtaining the delivery data can include determining current receptivity data of the recipient. Determining the current receptivity data of the recipient can include predicting receptivity of the recipient based on at least one of: time data, calendar event data, biometric sensor data, other sensor data, active application data, location data, other user proximity data, or historical availability data.

Obtaining the delivery data representing the likelihood of the recipient associated with the recipient device acting on the message can include determining a likelihood value of the recipient performing at least one of: consuming the message, or taking further action with respect to the message.

Further operations can include facilitating interaction with the message (e.g., peeking) by the recipient prior to the delayed delivery time.

Further operations can include at least one of: sending, to the sender device, data representing the delayed delivery time, and/or sending, to the sender device, data representing an offer for an alternate communication from the sender device to the recipient device.

Further operations can include receiving an acceptance of the offer, and, in response, canceling the delivery of the message to the recipient device.

Determining that the delivery data satisfies the delayed delivery criterion can include evaluating recipient profile data of the recipient.

Further operations can include delivering the message to the recipient device based on the delayed delivery time as part of a message batch.

The message batch can include a group of respective messages with different respective original sending times, and further operations can include ordering the group of messages, based on ordering criterion, into a presentation order for presentation to the recipient that does not correspond to the original respective sending times.

One or more example aspects are represented in FIG. 13, and, for example, can correspond to operations, such as of a method. Example operation 1302 represents receiving, by a system comprising a processor, a message from a sender device directed to a recipient device associated with a recipient. Example operation 1304 represents determining, by the system, current availability data of the recipient. Example operation 1306 represents determining, by the system, current receptivity data of the recipient. Example operation 1308 represents determining, by the system, that the current availability data and the current receptivity data do not satisfy delivery criteria. Example operation 1310 represents predicting, by the system, future availability of the recipient. Example operation 1312 represents predicting, by the system, future receptivity of the recipient. Example operation 1314 represents determining, by the system, a delayed delivery time based on the predicted future availability and predicted future receptivity. Example operation 1316 represents delivering, by the system, the message to the recipient device at the delayed delivery time.

Further operations can include sending, by the system, data representing the delayed delivery time to the sender device.

The message can be part of group of respective delayed messages associated with different respective original sending times, and further operations can include ordering, by the system based on ordering criterion, the group of messages into a presentation order for presentation to the recipient, wherein the presentation order does not correspond to the original respective sending times.

One or more aspects are represented in FIG. 14, such as implemented in a machine-readable medium, including executable instructions that, when executed by a processor, facilitate performance of operations. Example operation 1402 represents obtaining a message for delivery to a first user device of a first user and a second user device of a second user. Example operation 1402 represents determining that the first user has a first likelihood value of acting on the message that satisfies a delayed delivery criterion, and, in response to the determining that the first user has the first likelihood value, delaying delivery of the message to the first user device. Example operation 1402 represents determining that the second user has a second likelihood value of acting on the message that does not satisfy the delayed delivery criterion, and in response to the determining that the second user has the first likelihood value, delivering the message to the second user device without delay.

Determining that the first user has the first likelihood value can include evaluating at least one of: first availability data associated with the first user or first receptivity data associated with the first user; determining that the second user has the second likelihood value can include evaluating at least one of: second availability data associated with the second user or second receptivity data associated with the second user.

Determining that that the first user has the first likelihood value can include evaluating at least one of: an identity of a sender of the message and first user profile data; determining that the second user has the second likelihood value can include evaluating at least one of: the identity of the sender of the message and second user profile data.

As can be seen, the technology described herein facilitates managing the delivery of incoming electronic messages on behalf of a user, based on the user's status with respect to the user's likelihood of acting on each message. The technology described herein provides an intelligent way for a service or the like to determine when (e.g., without delay or with delay) and/or how (e.g., in a prioritized batch) to deliver messages to a recipient. The technology described herein also provides the message sender with feedback as to the status and timing of their delivery, as well as options as to alternative ways of contacting a recipient.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1× 2), (2×2), (4×2), (8×2) and (2× 4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 15:
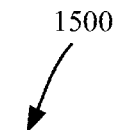
FIG. 15 illustrates an example block diagram of an example mobile handset operable to engage in a system architecture that facilitates wireless communications according to one or more embodiments described herein.

Referring now to FIG. 15, illustrated is a schematic block diagram of an example end-user device (such as user equipment) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 810, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
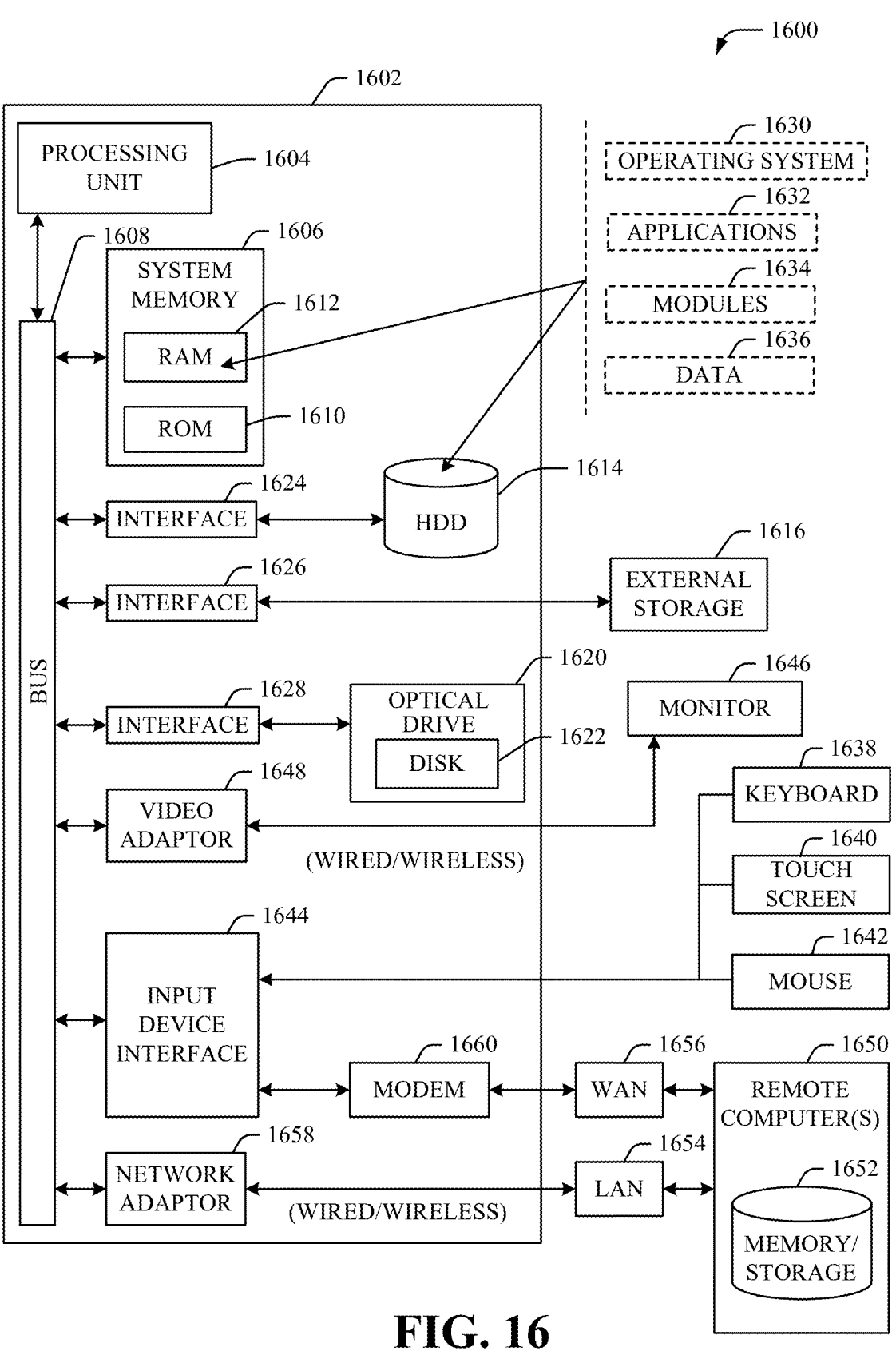
FIG. 16 illustrates an example block diagram of an example computer/machine system operable to engage in a system architecture that facilitates wireless communications according to one or more embodiments described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD), non-volatile memory and other storage technology could be used in addition to, or in place of, an HDD 1614, and can be internal or external. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally include emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can include one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1594 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 16 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), program-mable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions per-formed by the above described components, devices, cir-cuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, struc-tured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any infor-mation delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infra-red and other wireless media Further, terms like "user equipment," "user device," "mobile device," "mobile," station," "access terminal," "ter-minal," "handset," and similar terminology, generally refer to a wireless device utilized by a subscriber or user of a wireless communication network or service to receive or convey data, control, voice, video, sound, gaming, or sub-stantially any data-stream or signaling-stream. The forego-ing terms are utilized interchangeably in the subject speci-fication and related drawings. Likewise, the terms "access point," "node B," "base station," "evolved Node B," "cell," "cell site," and the like, can be utilized interchangeably in the subject application, and refer to a wireless network component or appliance that serves and receives data, con-trol, voice, video, sound, gaming, or substantially any data-stream or signaling-stream from a set of subscriber stations. Data and signaling streams can be packetized or frame-based flows. It is noted that in the subject specification and drawings, context or explicit distinction provides differen-tiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appre-ciated that such terms can refer to human entities, associated devices, or automated components supported through arti-ficial intelligence (e.g., a capacity to make inference based on complex mathematical formalisms) which can provide simulated vision, sound recognition and so forth. In addi-tion, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permu-tations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system comprising:
a processor; and
a memory that stores executable instructions that, when executed by the processor of the system, facilitate performance of operations, the operations comprising:
receiving a message from a sender device directed towards a recipient device;
obtaining delivery data representing a likelihood of a recipient associated with the recipient device acting on the message;
determining that the delivery data satisfies a delayed delivery criterion; and
in response to the determining that the delivery data satisfies the delayed delivery criterion, sending an interactive control to be displayed on a user interface of a messaging application executed by the sender device, wherein the interactive control, when selected, causes the messaging application to initiate an alternate communication from the sender device to the recipient device.

2. The system of claim 1, further comprising:
determining a delayed delivery time for delaying a delivery of the message to the recipient device, wherein the delayed delivery time is based on at least one of: current receptivity data or current availability data of the recipient.

3. The system of claim 2, wherein the operations further comprise:
delivering the message to the recipient device based on the delayed delivery time.

4. The system of claim 1, wherein the obtaining of the delivery data comprises determining current availability data of the recipient.

5. The system of claim 4, wherein the determining of the current availability data of the recipient comprises predicting availability of the recipient based on at least one of: time data, calendar event data, biometric sensor data, other sensor data, active application data, location data, other user proximity data, or historical availability data.

6. The system of claim 1, wherein the obtaining of the delivery data comprises determining current receptivity data of the recipient.

7. The system of claim 6, wherein the determining of the current receptivity data of the recipient comprises predicting receptivity of the recipient based on at least one of: time data, calendar event data, biometric sensor data, other sensor data, active application data, location data, other user proximity data, or historical availability data.

8. The system of claim 1, wherein the obtaining of the delivery data representing the likelihood of the recipient associated with the recipient device acting on the message comprises determining a likelihood value of the recipient performing at least one of: consuming the message, or taking further action with respect to the message.

9. The system of claim 2, wherein the operations further comprise:
sending, to the sender device, data representing the delayed delivery time.

10. The system of claim 3, wherein the operations further comprise:
receiving an acceptance of an offer for the alternate communication, and, in response, canceling the delivery of the message to the recipient device.

11. The system of claim 1, wherein the determining that the delivery data satisfies the delayed delivery criterion comprises evaluating recipient profile data of the recipient.

12. The system of claim 2, wherein the operations further comprise:
delivering the message to the recipient device based on the delayed delivery time as part of a message batch.

13. The system of claim 12, wherein the message batch comprises a group of respective messages with different respective original sending times, and wherein the operations further comprise:
ordering the group of respective messages, based on an ordering criterion, into a presentation order for presentation to the recipient that does not correspond to the different respective original sending times.

14. A method comprising:
receiving, by a system comprising a processor, a message from a sender device directed to a recipient device associated with a recipient;
determining, by the system, current availability data of the recipient;
determining, by the system, current receptivity data of the recipient;
determining, by the system, that the current availability data and the current receptivity data do not satisfy a delivery criterion; and
sending, by the system, an interactive control to be displayed on a user interface of a messaging application executed by the sender device, wherein the interactive control, when selected, causes the messaging application to initiate an alternate communication from the sender device to the recipient device.

15. The method of claim 14, further comprising:
predicting, by the system, future availability of the recipient;
determining, by the system, a delayed delivery time based on the future availability that is predicted; and
sending, by the system, data representing the delayed delivery time to the sender device.

16. The method of claim 15, further comprising:
delivering, by the system, the message to the recipient device at the delayed delivery time and wherein the message is part of a group of respective delayed messages associated with different respective original sending times, and ordering, by the system based on an ordering criterion, the group of respective delayed messages into a presentation order for presentation to the recipient, wherein the presentation order does not correspond to the different respective original sending times.

17. A non-transitory machine-readable medium, comprising executable instructions that, when executed by a processor, facilitate performance of operations, the operations comprising:

receiving a message from a sender device directed towards a recipient device;

obtaining delivery data representing a likelihood of a recipient associated with the recipient device acting on the message;

determining that the delivery data satisfies a delayed delivery criterion; and in response to the determining that the delivery data satisfies the delayed delivery criterion, sending an interactive control to be displayed on a user interface of a messaging application executed by the sender device, wherein the interactive control, when selected, causes the messaging application to initiate an alternate communication from the sender device to the recipient device.

18. The non-transitory machine-readable medium of claim 17, the operations further comprising:

determining a delayed delivery time for delaying a delivery of the message to the recipient device, wherein the delayed delivery time is based on at least one of: current receptivity data or current availability data of the recipient.

19. The non-transitory machine-readable medium of claim 18, wherein the operations further comprise:

delivering the message to the recipient device based on the delayed delivery time.

20. The non-transitory machine-readable medium of claim 17, wherein the obtaining of the delivery data comprises determining current availability data of the recipient.

* * * * *